(12) United States Patent
Bayouth

(10) Patent No.: US 9,679,307 B2
(45) Date of Patent: Jun. 13, 2017

(54) SYSTEM AND METHOD FOR SEARCH ENGINE CAMPAIGN MANAGEMENT

(75) Inventor: Taylor Bayouth, Studio City, CA (US)

(73) Assignee: Hoostopia.com Inc., Fort Lauderdale, FL (US)

(*) Notice: Subject to any disclaimer, the term of this patent is extended or adjusted under 35 U.S.C. 154(b) by 615 days.

(21) Appl. No.: 13/452,534

(22) Filed: Apr. 20, 2012

(65) Prior Publication Data
US 2012/0278284 A1 Nov. 1, 2012

Related U.S. Application Data

(60) Provisional application No. 61/477,996, filed on Apr. 21, 2011.

(51) Int. Cl.
*G06F 17/30* (2006.01)
*G06Q 30/00* (2012.01)
*G06Q 30/02* (2012.01)

(52) U.S. Cl.
CPC ... *G06Q 30/0241* (2013.01); *G06F 17/30011* (2013.01); *G06F 17/30616* (2013.01); *G06F 17/30864* (2013.01); *G06F 17/30873* (2013.01); *G06Q 30/0246* (2013.01); *G06Q 30/0276* (2013.01); *G06Q 30/0277* (2013.01)

(58) Field of Classification Search
CPC .......... G06Q 30/0241; G06Q 30/0276; G06Q 30/0277; G06Q 30/0246; G06Q 30/0204; G06F 17/30011; G06F 17/30864; G06F 17/30616; G06F 17/30873
USPC .......... 705/14.27, 14.4, 14.43, 14.49, 14.54, 705/14.56, 14.73; 709/203, 206, 709/215–220; 707/705–710, 803–805
See application file for complete search history.

(56) References Cited

U.S. PATENT DOCUMENTS 5,937,392 A * 8/1999 Alberts ...................... 705/14.52
7,822,637 B2 * 10/2010 Shkedi ....................... 705/14.49
(Continued)

FOREIGN PATENT DOCUMENTS

WO WO 02/052385 * 7/2002

OTHER PUBLICATIONS

Peter J. Fleming et al. "Optimal Advertising Campaign Generation for Multiple Brands Using MOGA", IEEE Transactions on Systems, Man, and Cybernetics—Part C: Applications and Reviews, vol. 37, No. 6, Nov. 2007, pp. 1190-1201.*

*Primary Examiner* — Srirama Channavajjala
(74) *Attorney, Agent, or Firm* — Schwegman Lundberg & Woessner, P.A.

(57) ABSTRACT

A system for managing search engine campaigns may include storing advertising campaign data associated with a customer account and generating a synchronization thread for an advertising platform selected from a plurality of advertising platforms. The system may synchronize the advertising campaign data with the advertising platform by selecting a proxy class associated with the advertising platform; requesting from the advertising platform, via the proxy class, a set of campaigns that are associated with the customer account and the advertising platform; receiving, from the advertising platform, the set of campaigns associated with the customer account; and updating the advertising campaign data stored in the database based on the set of campaigns received from the advertising platform and a set of campaigns stored in the advertising campaign data.

20 Claims, 8 Drawing Sheets

(56) References Cited

U.S. PATENT DOCUMENTS

2007/0027754 A1* 2/2007 Collins et al. ............... 705/14
2007/0027756 A1* 2/2007 Collins et al. ............... 705/14
2007/0174118 A1* 7/2007 Dekel et al. ................. 705/14
2007/0239528 A1* 10/2007 Xie et al. ..................... 705/14
2008/0040228 A1* 2/2008 Gutierrez ..................... 705/14
2009/0292677 A1* 11/2009 Kim ............................. 707/3

* cited by examiner

SYSTEM AND METHOD FOR SEARCH ENGINE CAMPAIGN MANAGEMENT

CROSS-REFERENCE TO RELATED APPLICATIONS

This patent application claims the benefit of priority, under 35 U.S.C. Section 119(e), to U.S. Provisional Patent Application Ser. No. 61/477,996, entitled SYSTEM AND METHOD FOR SEARCH ENGINE CAMPAIGN MANAGEMENT," filed on Apr. 21, 2011, which is incorporated by reference in its entirety.

BACKGROUND

Companies advertise in multiple mediums such as print, video, radio, and on the Internet. As with other mediums, the Internet provides multiple possible avenues to advertise.

SUMMARY

A system for managing search engine campaigns may include storing advertising campaign data associated with a customer account and generating a synchronization thread for an advertising platform selected from a plurality of advertising platforms. The system may synchronize the advertising campaign data with the advertising platform by selecting a proxy class associated with the advertising platform; requesting from the advertising platform, via the proxy class, a set of campaigns that are associated with the customer account and the advertising platform; receiving, from the advertising platform, the set of campaigns associated with the customer account; and updating the advertising campaign data stored in the database based on the set of campaigns received from the advertising platform and a set of campaigns stored in the advertising campaign data.

BRIEF DESCRIPTION OF THE DRAWINGS

Some embodiments are illustrated by way of example and not limitation in the figures of the accompanying drawings in which.

DETAILED DESCRIPTION

Figure 1:
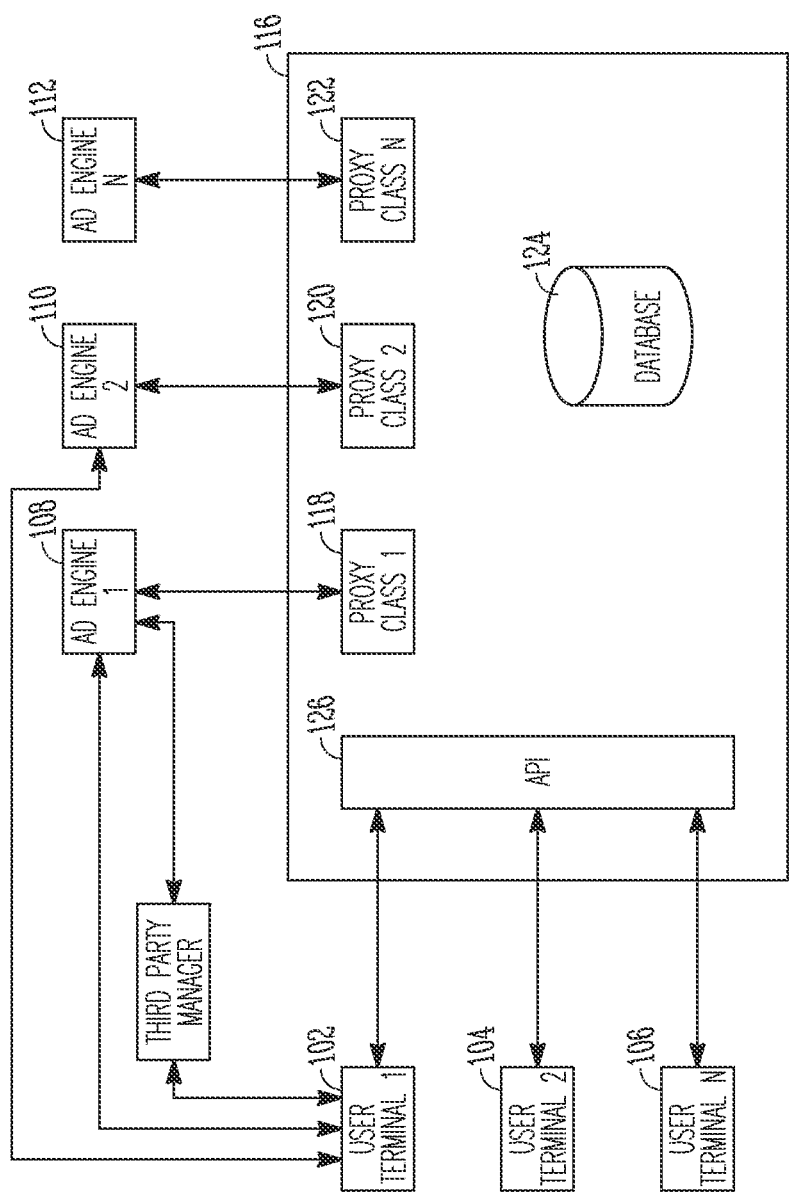
FIG. 1 is a is a system diagram, according to an example embodiment.

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Companies advertise in multiple mediums such as print, video, radio, and on the Internet. As with other mediums, the Internet provides multiple possible avenues to advertise. For example, consider fictional company ACME that sells fictional product ABC. If ACME is trying to create a brand awareness, ACME may buy advertisements on individual websites. However, ACME may not know anything about the demographics of visitors on an individual site and therefore the visitors may have no interest in product ABC.

In addition to direct advertising, ACME may use contextual advertising. In an embodiment, contextual advertising is a form of targeted advertising for advertisements appearing on websites or other media. In various embodiments, the advertisements themselves are selected and served based on the content displayed to the user or searches completed by the users according to an advertising campaign. For example, keywords in a search or included on a webpage may trigger one or more advertisements to be displayed to the user. Consider product ABC as car insurance. ACME may generate an advertising campaign with keywords "vehicle," "car," "car insurance," and "car accident." In order for ACME to implement the campaign it may create accounts at one or more search engines.

Managing advertising campaigns across multiple search engines presents certain problems. For example, in order to have the same keywords used in an advertising campaign in multiple search engines ACME may have to manually login into each search engine ad platform. This process is time consuming and introduces the possibility that different keywords may be used across the different search engines. Additionally, in various embodiment, search engines provide application programming interfaces (APIs) that enable third-party tools to interface with the advertising campaigns managed by the search engine. However, the introduction of third party tools presents additional problems such as making sure data being pulled from a search engine is up-to-date. Further, each search engine has a separate API with separate response times that occur while communicating with the search engine. In various embodiments, a merchant campaign engine facilitates managing advertising campaigns across multiple advertising platforms. The label merchant campaign engine is exemplary in nature. As such, the merchant campaign engine may be used, implemented, and managed by entities other than merchants.

FIG. 1 is a system diagram of an example implementation of a system to manage advertising campaigns across at least one advertising engine. Illustrated are user terminals 102, 104, 106, advertising platforms 108, 110, 112 (also referred to as search engines), third-party advertising manager 114, and merchant campaign engine (ME) 116. In an embodiment, merchant campaign engine 116 includes proxy classes 118, 120, 122, database 124, and merchant campaign engine API 126.

FIG. 1 further illustrates connections between the elements shown. For example user terminal 102 has a connection to search engine 108, search engine 110, merchant campaign engine API 126, and third-party manager 114. These connections may be made over a network. The network may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network may include a single local area network (LAN) or wide-area network (WAN), or combinations of LAN's or WAN's, such as the Internet. Various devices (e.g., user terminals, ad engines, and merchant campaign engine 116) coupled to the network may be coupled to the network via one or more wired or wireless connections.

In an embodiment, user terminals 102-106 are computers. In various embodiments, a computer may be a desktop computer, a mobile phone, a personal digital assistant, a tablet computer, or a laptop computer. In an embodiment, a computer includes a processor, storage device, display device, network interface, input device, and software application. The software application includes instructions which, when executed on the processor, configure the computer to perform certain functions. In various embodiments, the instructions may be stored on a non-transitory computer readable medium. For example, the software application may be a web browser application and stored on the storage device. When the web browser application is executed on the processor the computer may display a user interface on the display device. The user of the computer may use the input device to interact with the computer to access the Internet through the network interface.

In various embodiments, advertising platforms 108-112 serve advertisements to one or more devices. In various embodiments, an advertising platform stores customer information in a database. The customer information may include a username and password. Further, the customer information may include advertising campaigns that are run by the advertising platform for the customer.

In an embodiment, serving an advertisement means transmitting an advertisement in the form of audio, video, or text, to a computing device from a server. The advertisement may further include a URL which, when activated, directs a web browser to a website specified by the URL. For example, consider the use of a search engine. User terminal 104 may transmit a search request including one or more search terms in the form of an HTTP request to a web server hosting the search engine. The web server will format a response message that includes search results associated with the search terms. Additionally, the web server may select one or more advertisements to include in the response message. The use of an HTTP request as a messaging protocol is exemplary and other messaging protocols may be used.

In an embodiment, a web server includes a processor, storage device, display device, network interface, input device, and software application. The software application includes instructions which, when executed on the processor, configured the computer to perform certain functions. For example, the software application may be a web server application and stored on the storage device. When the web server application is executed on the processor the computer may respond to requests from client web browser applications (e.g., executed on user terminal 104). An administrator of the web server may use the input device to interact with the web server application to modify the functionality of the web server application. In various embodiments, the administrator may modify the web server application from a location remote from the web server.

In an embodiment, the advertisements included in the response message are selected by advertising platform 108. For example, consider that advertising platform 108 has a customer that has an advertising campaign. The advertising campaign includes keywords that the customer wants advertisements to be associated with. When search terms match the keywords included in an advertising campaign, one or more advertisements for the customer are selected to be included in the response message. Therefore, when the search results are displayed on a display device of the user terminal, advertisements for the customer are also displayed. In an embodiment the advertising platform and search engine are hosted and served from the same web server. Throughout this document an advertising platform may also be referred to as a search engine (SE).

In various embodiments, advertising platforms 108-112 serve ads for more than search engine results. For example, advertisements may be included in social networking websites, as banner advertisements, in e-mail marketing, or in general websites. The selection of the advertisements in these other mediums is similar to serving ads in search engine results. For example, the mediums may be parsed to determine which words are displayed on a webpage. If the words displayed match the keywords in an advertising campaign, an advertisement for the corresponding customer may be served. By way of example, if a user posts a status update to a social networking site and the update includes a keyword, the advertising platform may serve an advertisement to be placed on the user's profile or in a dedicated advertising spot for that social networking site.

In an embodiment, merchant campaign engine 116 exposes a unified interface for interacting with the APIs of advertising platforms 108-112. The service may be hosted across one or more web servers. Merchant campaign engine 116 maintains database 124 for advertising completed through merchant campaign engine 116. In an embodiment, merchant campaign engine 116 provides a merchant user interface (UI) that interfaces with merchant campaign engine API 126. The merchant UI may be displayed, for example, on a user terminal 104. In an embodiment, merchant campaign engine 116 is a web server.

In various embodiments, the following are the Domain Objects used in merchant campaign engine 116: Reseller Account, Customer Accounts, Search Engine Accounts, Campaign, AdGroup, AdCreative, Keyword, and Location target. In an embodiment the Reseller Account object represents merchant campaign engines reseller accounts. In an embodiment, the Customer Account Object holds customer details. In an embodiment, the Search Engine Accounts Object holds searching engine account details for a customer. In an embodiment, the Location Target Object represents a targeted location (e.g., a geographic area such as country, state/province, metro or city). In various embodiments each of these main objects is defined for each advertising platform.

In various embodiments, the hierarchy with respect to some of the Domain Objects is as follows:

| Entity | Is a Parent Of | Is a Child Of |
|---|---|---|
| SearchEngineAccount | Campaign | |
| AdGroup | Creative, Keyword | Campaign |
| Creative | | AdGroup |
| Keyword | | AdGroup |

Figure 2:
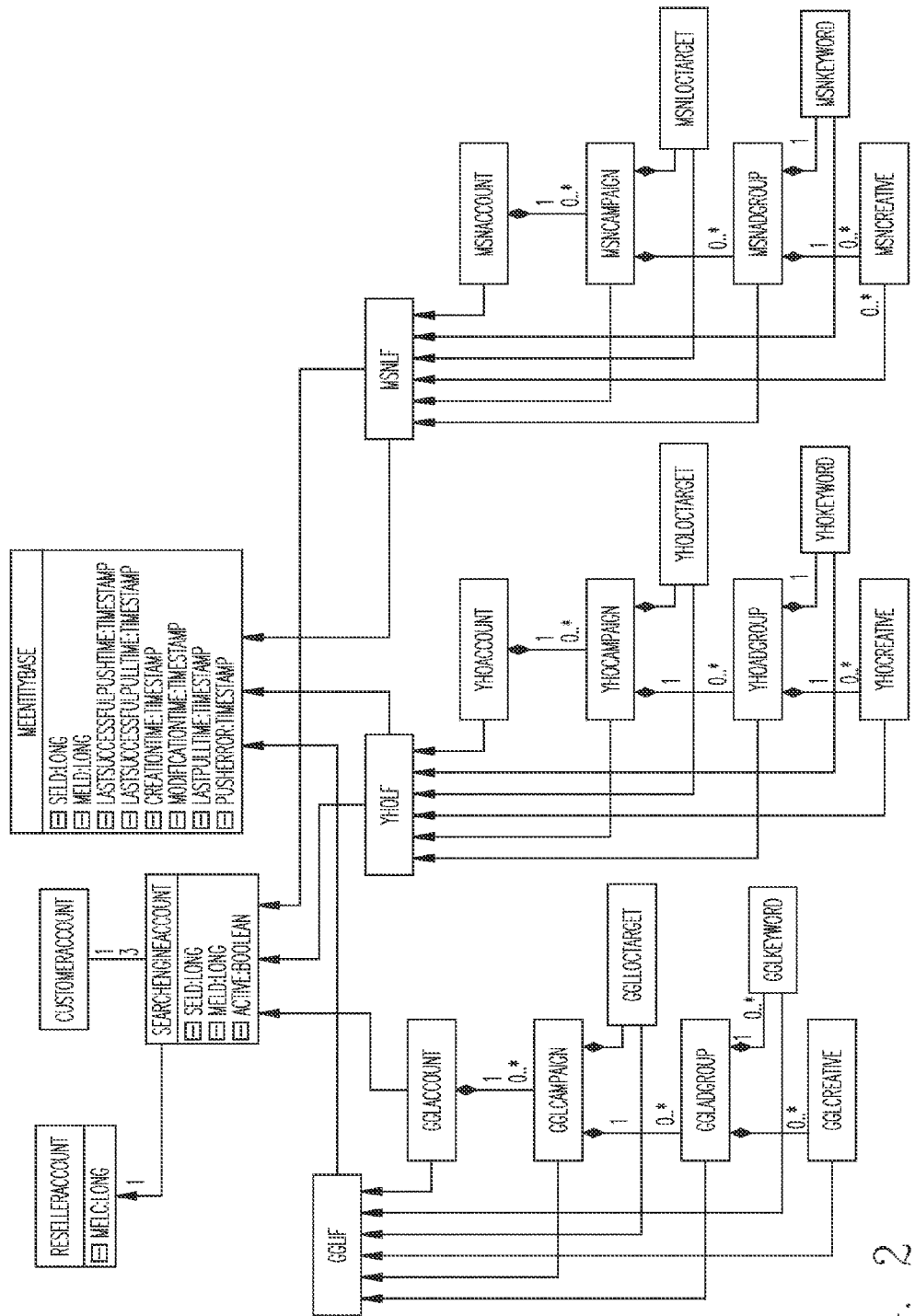
FIG. 2 is a relationship diagram, according to an example embodiment.

FIG. 2 is a relationship diagram between Objects in merchant campaign engine 116, according to an example embodiment. In an embodiment, the MEEntityBase Object is an abstract class which all the Domain Objects extend from. The EntityBase may have the following fields:

| Base field names | Purpose |
|---|---|
| MeId | Unique identifier within adTraction |
| SeId | Unique identifier for the SE |
| creationTime | Time when this object was first created in ME |
| ModifcationTime | Time when this object was last modified by ME API clients |
| SuccessfulPushTime | Time when the last push to SE was successful |
| SuccessfulPullTime | Time when the last pull from SE was successful |
| LastPullTime | Time when the last pull was attempted. If this was successful, this should be the same as SuccessfulPushTime. |
| pushError | Field to save the error when attempted to push from SE. |

Thus, all Objects may have these fields. The fields may help the clients (e.g., a user interface such as a webpage, provided by the ME that is linked to the ME API) to know the entity status. For example, it can help answer the following: 1) Are the entities in synch with SE? 2) When did we last modify the entity and have the latest changes gone to SE? 3) What was the error in the last response? The active field in a SearchEngineAccounts table identifies if the account is active or inactive in that particular SE.

Referring back to FIG. 1, in various embodiments, proxy classes 118-122 communicate with advertising platforms 108-112. For example, a user may create an advertising campaign using the merchant UI and stored in database 124. The user may further indicate that the advertising campaign should be used by advertising platforms 110 and 112. In various embodiments, the user has accounts on advertising platforms 110 and 112. Further, database 124 stores the credential information of the user for advertising platforms 110 and 112. Accordingly, merchant campaign engine 116 may use proxy class 120 to communicate with advertising platform 110 and update the user's account on advertising platform 110 to include the created advertising campaign. Similarly, proxy class 122 communicate with advertising platform 112 and update the user's account to include the advertising campaign. In various embodiments the same proxy class may be used to communicate with multiple advertising platforms.

Figure 3:
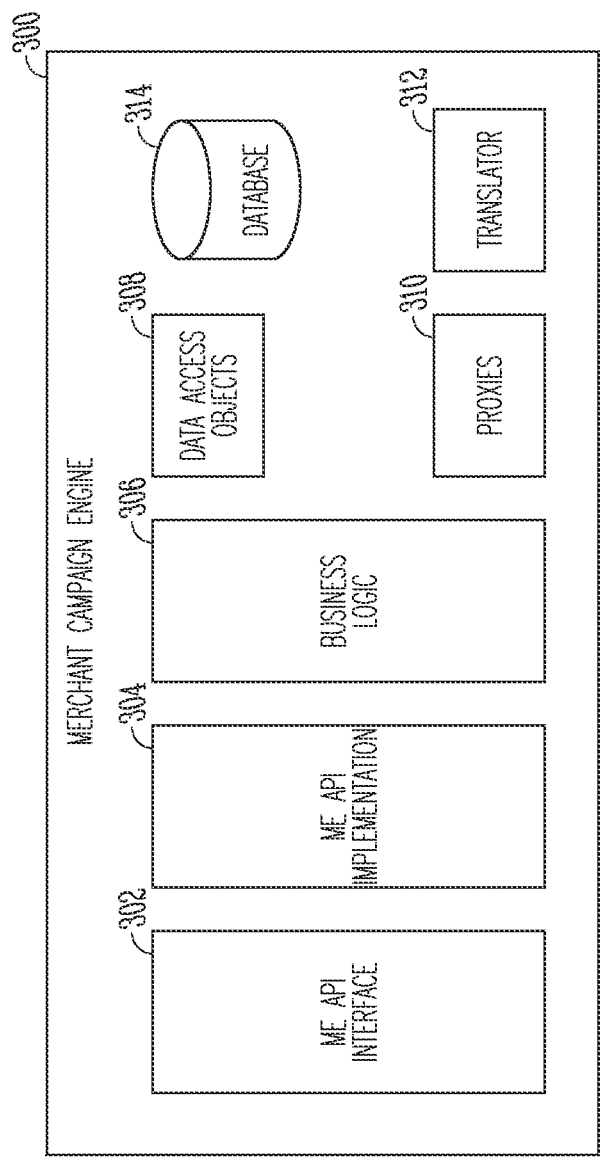
FIG. 3 is a diagram of a merchant campaign engine, according to an example embodiment.

FIG. 3 is a more detailed diagram of a merchant campaign engine. Illustrated is merchant campaign engine 300 including merchant engine application programming interface (API) interface 302, merchant engine API implementation 304, business logic 306, data access objects (DAOs) 308, proxies 310, translators 312 and database 314. In an example embodiment, merchant campaign engine 300 is depicted as a set of layers going from left to right. Outside of merchant campaign engine 300 on the left (not depicted) are clients (e.g., a user terminal) and outside of merchant campaign engine 300 on the right (not depicted) are advertising platforms. API Interface 302 and API implementation 304 may be collectively referred to as the API.

In an embodiment, merchant engine API Interface 302 is an API interface that is exposed to the clients. In an embodiment, the API is implemented and exposed as a set of web-services hosted on a web server. The simple object access protocol may be used to exchange information for the API. The API may be implemented and specified in web services description language (WSDL). Merchant campaign engine API implementation may be programmed in PHP for the interface exposed by merchant campaign engine API Interface 302. While PHP is used, other programming and scripting languages may be used in the implementation. The API may require authentication for each client that uses the API. The authentication credentials (e.g., username/password) for each client may be stored database 314. In various embodiments, the credentials are passed in a message header for each API call.

In an embodiment, API interface 302 is able to handle calls from multiple advertising platforms. Each advertising platform has its own restrictions and validations that may need to be validated in business logic layer 306. Thus, In an embodiment, Objects specific to each advertising platform are accepted separately as inputs. For example, Campaign Objects may be needed for each advertising platform. Objects are entities that may be manipulated by the commands of a programming language, such as a value, variable, function, or data structure. In an embodiment, a single Object may represent multiple advertising platforms.

In various embodiments the following push commands are defined in merchant campaign engine API interface 302: Create new campaign, "Create new AdGroup," "Insert keyword list," "Delete keyword list," "Insert geo target," "Delete geo target," "Insert ad creative," "Delete ad creative," "Create new customer accounts," and "Pause account." In various embodiments, the following pull commands are defined in merchant campaign engine API interface 302: "Get Search Engine Accounts," "Get Campaigns," "Get AdGroups," "Get Ads," and "Get Keywords." A push command may be a command in which data is transmitted to an advertising platform using merchant campaign engine 300. A pull command may be a command in which data is retrieved from an advertising platform using merchant campaign engine 300.

In an embodiment, a return Object may be common for all advertising platforms. The return Objects may be designed with the least restriction for the pull API methods of the advertising platforms. For example, if adverting platform A has a 30 character limit for campaign names and adverting platform B has a 25 character limit and adverting platform C has a 28 character limit, the Campaign object may be designed to have 25 characters so that it may represent Campaigns from all three advertising platforms.

In various embodiments, a response from the API is in the following format:

```
class AbstractResponse {
    int responseCode,
    String responseMessage,
    String detailedReponseMessage.
}
```

In an embodiment, if the responseCode is zero, the operation was successful and if the responseCode is greater than zero, the operation failed. Different error codes of greater than zero may be indicated which layer has caused the error (e.g., codes 1000-2000 indicate a problem in the ME API implementation layer).

The responseMessage may be a short user-friendly message. The detailedResponseMessage may be a long message with more details (like stack trace, error code given by SEs etc) intended to help the user and developer to understand, analyze and fix the problem. For operations involving more than one entity, the SEs throw an error for the whole batch indicating which one among this batch is the reason for the failure. In order to help the user easily understand which entity is causing a problem the MeId, SeId and the key field of the entity may be included in the DetailedReponseMessage. Key field entries may be: Ad—Ad title; Campaign—Campaign Name; AdGroup—AdGroup Name; and Keyword—Keyword Phrase.

In an embodiment, the business logic 306 layer controls the business rules and sequencing of calls used in merchant campaign engine 300. For example, the sequencing of calls to DAOs and Proxies is decided and implemented here. In an embodiment, Data Access Objects 308 are the sole interface to database 314. A data access object is a programming construct used to manipulate the data stored in database 314. For example, a DAO may be used to update a record in the database or to insert a record into the database. In an embodiment, proxies 310 are responsible for making the advertising platform API calls. In an embodiment, translators are responsible for translating merchant campaign engine domain objects to advertising platform objects and vice versa.

In various embodiments, push operations are not synchronous, instead all requests will be queued and processed. Each of the search engine (SE) APIs may have different response times in responding to requests. Therefore, because a user may not wait until the result of each push operation, the push operations are asynchronous.

In various embodiment, operations for each SE will be picked up by a Job (e.g., an asynchronous request) assigned for that particular SE. In an embodiment, there will not be one single Job pick up the operations for all SE's. The use of three separate Jobs may allow more control over the processing of operations for each SE. Additionally, in order to use tokens more effectively, it may be needed to group/batch the operations depending on the SE APIs. A token may be a cost unit that is exchanged for accessing a SE API. For example, retrieving a customer account balance may require 50 tokens. In various embodiments, the SE API have limits on how many tokens are allowed to be used for a given time period (e.g., 100 tokens per minute). Some SE APIs may allow operations to save tokens which require to group by campaigns (e.g. AdGroups etc). However, with other SE APIs this may not be possible.

The following table defines example operations types for the merchant campaign engine:

| Operation | OperationTypeId |
|---|---|
| Insert | 5 |
| Delete | 15 |
| Pause | 25 |

Figure 4A:
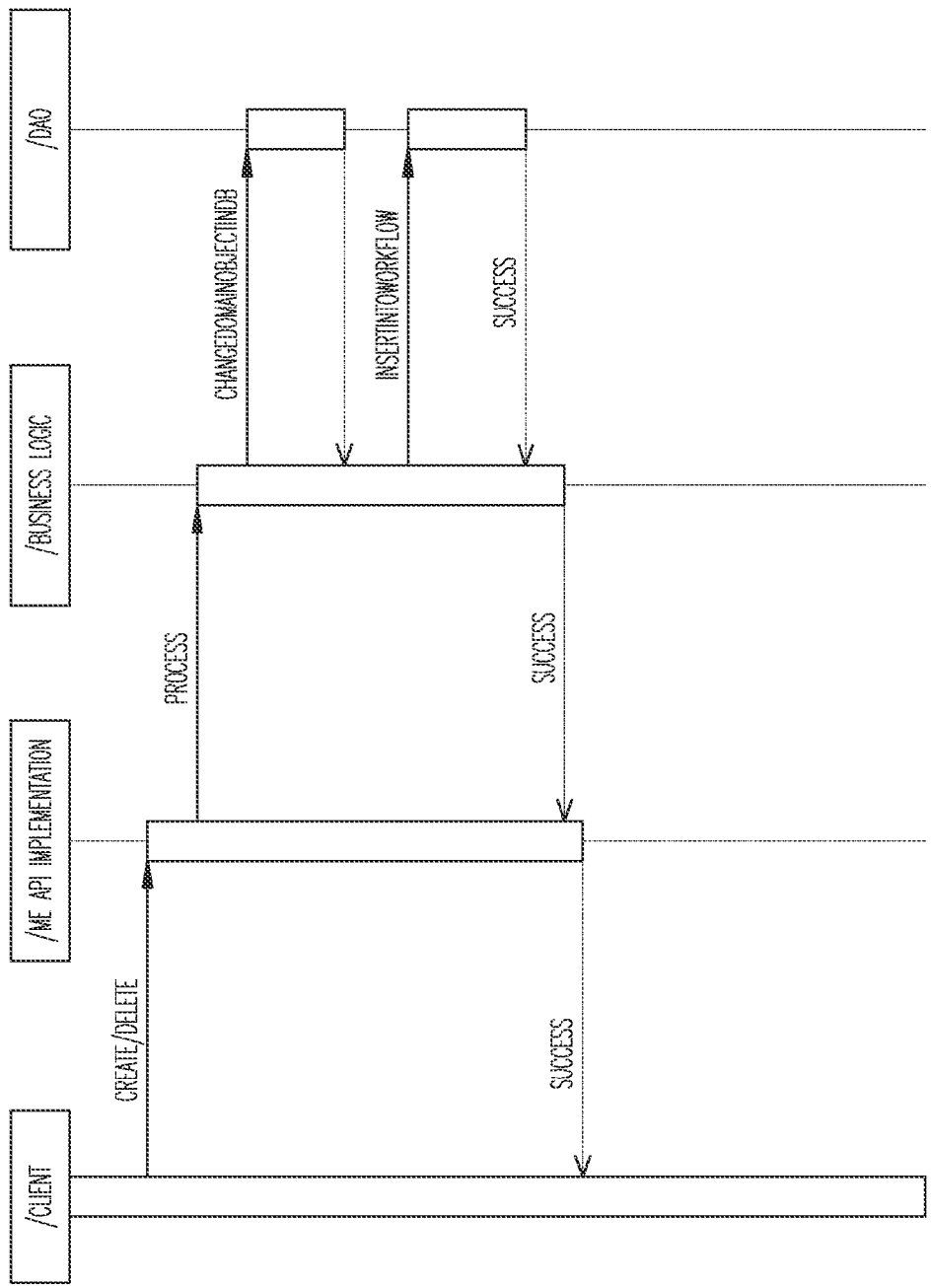
FIGS. 4A-4B are sequence diagrams, according to an example embodiment.
Figure 4B:
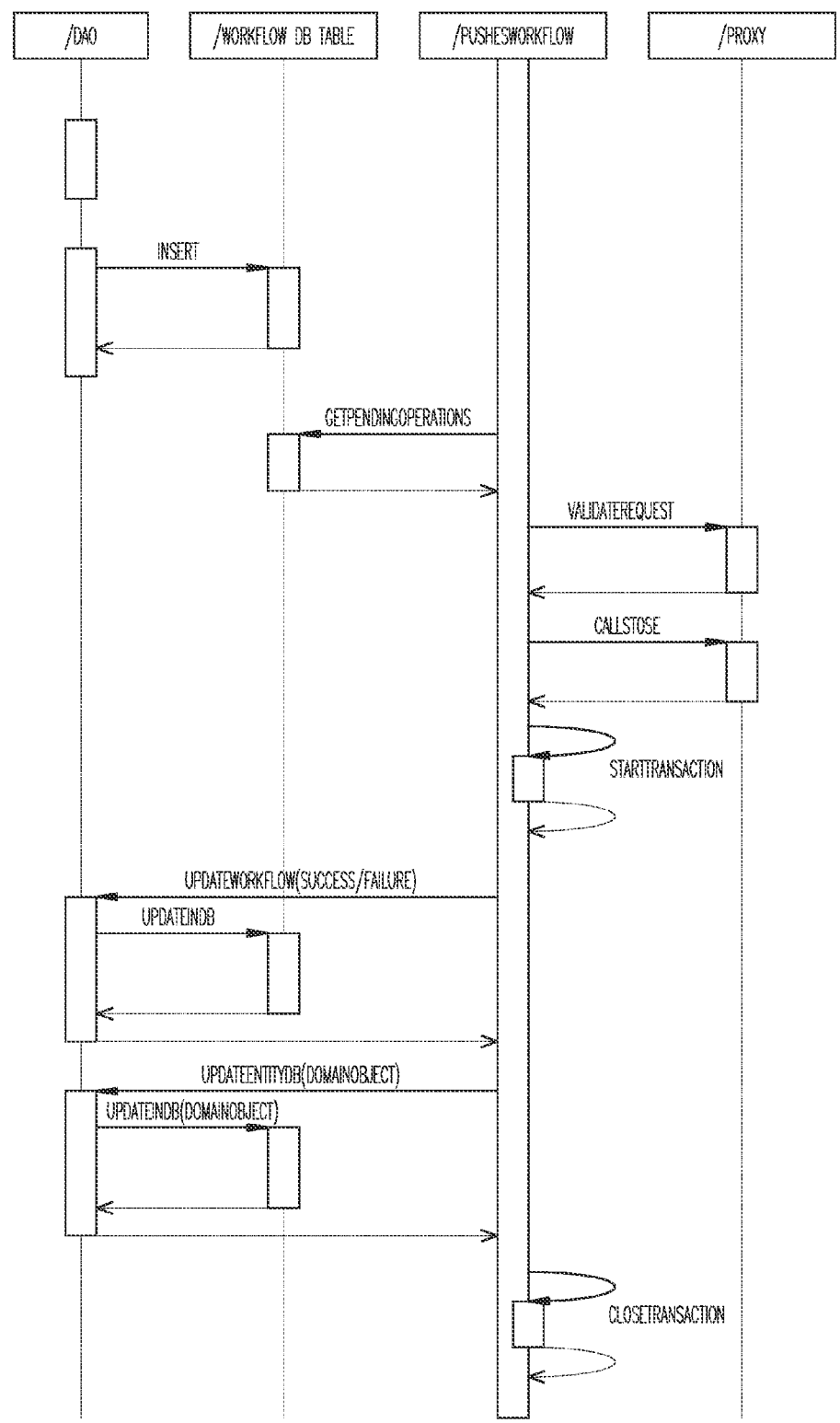

FIGS. 4A and 4B is a sequence diagram according to an example embodiment. In various embodiments, the below table explains the generic sequence of events (for all 3 SE's) while processing a Push operation. In an embodiment, subsequent jobs do not pick up the operations which are being processed by a previous job. Also, the pusher workflow frequency may be a configurable property in seconds.

| No. Calling Component | Method | Description |
|---|---|---|
| Client (ME UI or any client API) | create/delete | The call to create or delete a domain object in the SE's and AdTraction. The object can be campaign, adGroup, creative, keywords or locationTargets. |
| ME API Implementation | Process | Process the call as required. |
| Business Logic | ChangeDomainObjectInD | For create: the domain object is first saved in DB. Please note that at this point, the object will not have an SeId. For delete and pause: No changes at this point in the DB. |
| DAO | makeChangesinDB(domain Objects) | Actual calls to DB to make the changes. |
| Business Logic | InsertIntoWorkFlow | Make an entry in the Pushes_WorkFlow table. This table will act as a queue for all Push requests. |
| DAO | Insert | Actual call to DB to insert a record into Pushes_Workflow table. |
| PusherWorkflow | GetPendingOperations | PusherWorkflow wakes up at regular intervals to process the pending Push requests. This call is to get the pending operations from the workflow table. |
| PusherWorkflow | validateRequest | Call the validate request before the actual Create/Delete requests to ensure that the request is valid and we do no waste Quota units. (http://code.google.com/apis/adwords/v2009/docs/headers.html - check out the validateOnly field) |
| PusherWorkflow | CallsToSE | Calls the proxy to create/delete in SE. |
| PusherWorkflow | StartTransaction | Start a transaction boundary at this point for updating the workflow task and the corresponding domain object in DB. |
| PusherWorkflow | UpdateWorkflow | To update the workflow table with the result of the proxy call for the corresponding record. |
| DAO | UpdateInDB | The actual call to DB to update. |
| PusherWorkflow | updateEntityInDB(domain Object) | The corresponding entity/domain object is updated in DB. Create: Update with SeId, if successful. If failure, then set the pushError. Delete: Update the deleted field to the deleted status, if successful. Otherwise, update the pushError. Pause: Update the status field of the associated entities to indicate Paused status if successful. Otherwise, update the pushError. |

-continued

| No. Calling Component | Method | Description |
|---|---|---|
| DAO | updateInDB | The actual call to DB to update. |
| PusherWorkflow | CloseTransaction | Close transaction at this point in time. If there was an error, any database operations within this transaction boundary should get rolled back. |

In an embodiment, the Pushes_workflow table acts as the queue for all the push operations. The following table defines some of the columns according to various embodiments.

| Column Name | Type | Description |
|---|---|---|
| MeId | Number | Unique id for each unit of operation in this table. |
| creationTime | Timestamp | The time when this record was created. |
| jobStartTime | Timestamp | The time when the PusherWorkflow picked up this operation for processing |
| JobEndTime | Timestamp | The time when the PusherWorkflow ended the processing of this operation. |
| ErrorMessage | Varchar | Any error that occurred during the processing of this operation. |
| EntityType | Number | Allowed values are the entityIds defined in section 3.1. This denotes the entity that needs push. |
| SearchEngineId | Number | Allowed values are the searchEngineIds defined in section 3.2. This denotes the Search Engine the entity belongs to. |
| NoOfAttempts | Number | Number of times the PusherWorkflow attempted to push this operation to SE. |
| OperationTypeId | Number | Allowed values are the operationtypeIds defined in section 3.5.2. This denotes the operation type. |
| EntityMeId | Number | The MeId of the entity that needs push. This will give us reference to the object and its parent. |

In an embodiment, MeId in this table is not a unique identifier for each record in this table. Instead, an MeId may be the unique identifier for a unit of operation. For campaigns, adGroups and creatives, the push operations may be for a single entity and hence one record in this table represents one unit of operation. But, for keywords, one unit of operation may have a number of keywords and hence may represent a number of rows in this table. Similarly, for pause requests for a customer account, a unit of operation may have one record for each of the campaigns and the adGroups in all the 3 search engine accounts under the customer account. In various embodiments, this helps pick a unit of operations easily based on the MeId. This may also be future compatible as we can easily add batches of campaigns, adGroups and creatives as operation units by making them belong to one MeId. Hence the PusherWorkflow that picks up operations from this table may expect more than one record.

For logging and audit purposes, the Pushes_workflow_History table may have the same definition as Pushes_Workflow table. In an embodiment, all rows deleted from Pushes_Workflow table are saved in Pushes_Workflow_History table. A flag/property may be defined to turn On/Off the push for each SE.

In various embodiments, the following pseudo code is used for Push operations:
1. For all Delete operations, check if the entity also has other operations in the Pushes_Workflow table. Remove those operations from the table.
2. Pushes may be worked on from the top of the Domain Object hierarchy defined above, to the bottom. This may ensure that we have the parents in place before we attempt the children.
3. Process the Campaign operations first and then work down to Adgroups and Creatives.
4. Process the Keyword operations. Ensure that the keywords under the same adGroup are processed in the same batch.

With respect to getting the Pushes to process from Pushes_Workflow Table the following remarks may be considered in various embodiments. The PusherWorkflow should attempt to push any pending records in the Workflow table. A record with a non-null jobEndTime and a non-null errorMessage is a pending push as it failed in the past and has to be retried. A record with a null jobEndTime and jobStartTime is a pending push as it has never been attempted. To ensure that PusherWorkflow does not retry a failing record continuously, there may be a guard that PusherWorkflow will not process any records that were tried in the last X hours. X may be adjusted if required. If there are more than one record to be collected, then select the record with the older JobStartTime. Process only one unit of operation at a time, in an example embodiment.

In various embodiments, any runtime or other errors/exception during the processing of a particular record should be caught and logged in the ErrorMessage column and also in the pushError column of the entities being attempted.

In various embodiments, the Collector_Workflow table is updated at all times. The JobStartTime, JobEndTime and ErrorMessage may be fields which are always updated to maintain the robustness of Report Collection.

In various embodiments, each SE has its own list of countries, states, cities, etc., for location targeting. The list of location names acceptable to each SE is different to the other SE. In an embodiment, ME will not save the details of acceptable geo targets or validate the given geoTarget against each SE. In an embodiment, the assumption is that the client application/system passes on the accepted location name for each SE.

Each SE may have its own interface for creating GeoTargets. For example, search engine ABC may require the following target field: WOEID. In an embodiment, WOEID is a unique Id for a searching engine ABC geoTarget. In an embodiment, it is assumed that the client of the ME API provides this Id. In an embodiment, search engine DEF requires fields of Country, State, City, Metro, Latitude, Longitude, and Radius. Latitude, longitude and radius may be together required for Radius Targeting. In an embodiment, all 3 of them should be null or all should be non-null. For each country that is present, a CountyTarget may be created for the campaign and for a state, a StateTarget and so on. In an embodiment, search engine GHI requires fields of Latitude, Longitude, RadiusDistanceUnits, RadiusInUnits, Country, State, City, and Metro. In an embodiment, Latitude, Longitude, RadiusDistanceUnits and RadiusInUnits are together used for Proximity Targetting. Either all four of them should be null or all should be non-null, in an embodiment. For each country that is present, a CountyTarget may be created for the campaign. For a state, a ProvinceTarget and so on.

Figure 5:
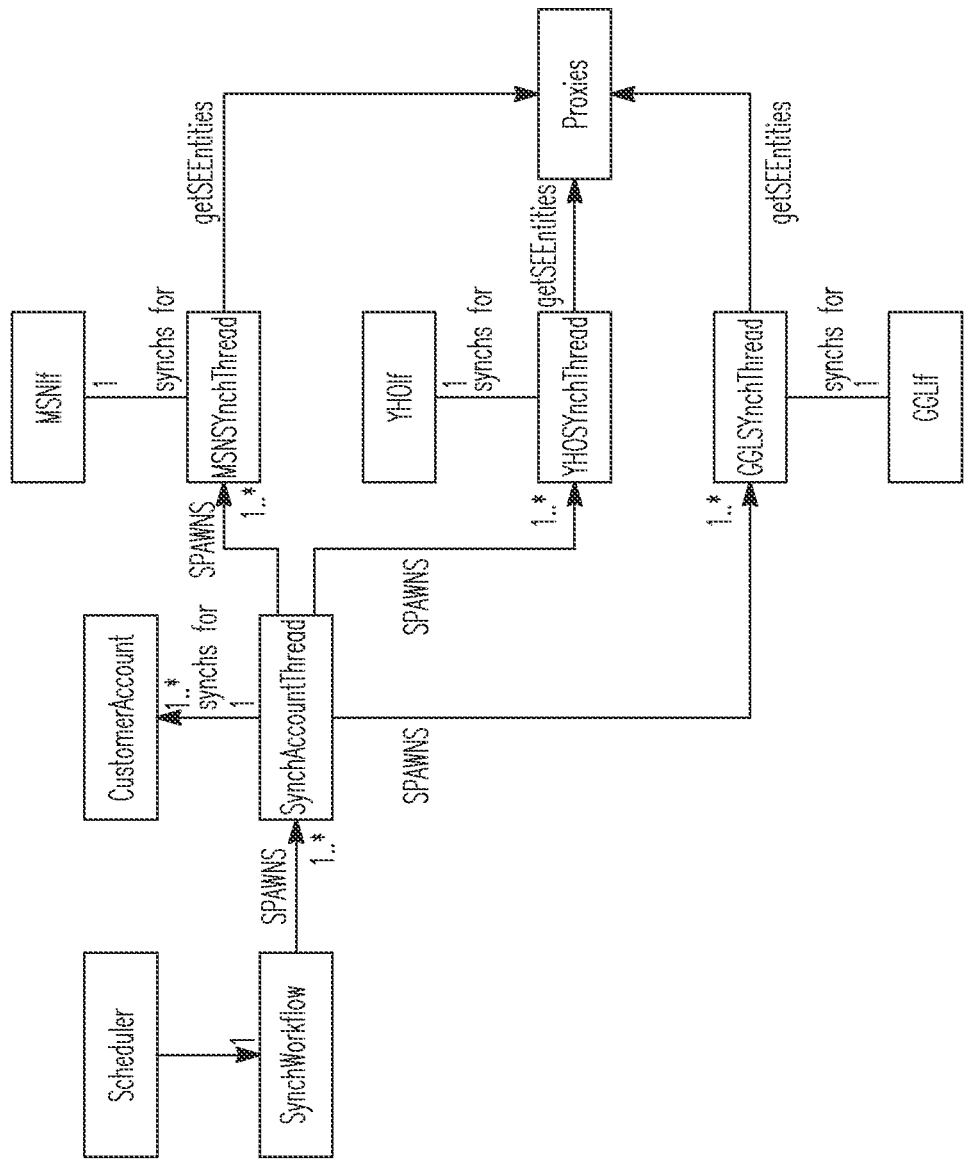
FIG. 5 is a flow diagram, according to an example embodiment.

In various embodiments, a database (e.g., database 314) is synchronized with the Search Engines for all the customer accounts configured in the merchant campaign engine. The campaigns, the geoTargets associated with the campaigns, the adGroups, the ads, the keywords and the associated bids may be updated in the User Interfaces for the advertising platforms themselves (e.g., outside of the ME UI). Collectively, the data stored in the database may be referred to as local advertising campaign data. Therefore, the merchant campaign engine may pull in the details for all active accounts in ME and update them. In an embodiment, this synch happens every day but may be configured to synch more or less times a day. FIG. 5 is a relationship diagram of the entities involved in a Synch, according to an example embodiment. MSN, YHO, and GGL are example searching engines. In an embodiment, the advertising data received and stored at the search engines may be referred to as remote advertising campaign data.

In an embodiment, the Synch_workflow table is the main work flow table for Report Collection and is where the state and the result of synchronizations for all the previous days and for all the customer accounts lie. The Synch_workflow table acts as the queue for all the push operations. The following table defines some of the columns according to various embodiments.

| Column Name | Type | Description |
| --- | --- | --- |
| MeId | Number | Unique id for each unit of operation in this table. |
| jobStartTime | Timestamp | The time when the CollectorWorkflow last picked up this operation for processing |
| JobEndTime | Timestamp | The time when the CollectorWorkflow ended the processing of this operation. |
| ErrorMessage | Varchar | Any error that occurred during the processing of this operation. |
| searchEngineAccountId | Number | Allowed values are the Meids of the search engine accounts defined in section 3.1. This denotes the reseller account for which the report has to be collected. |

Figure 6A:
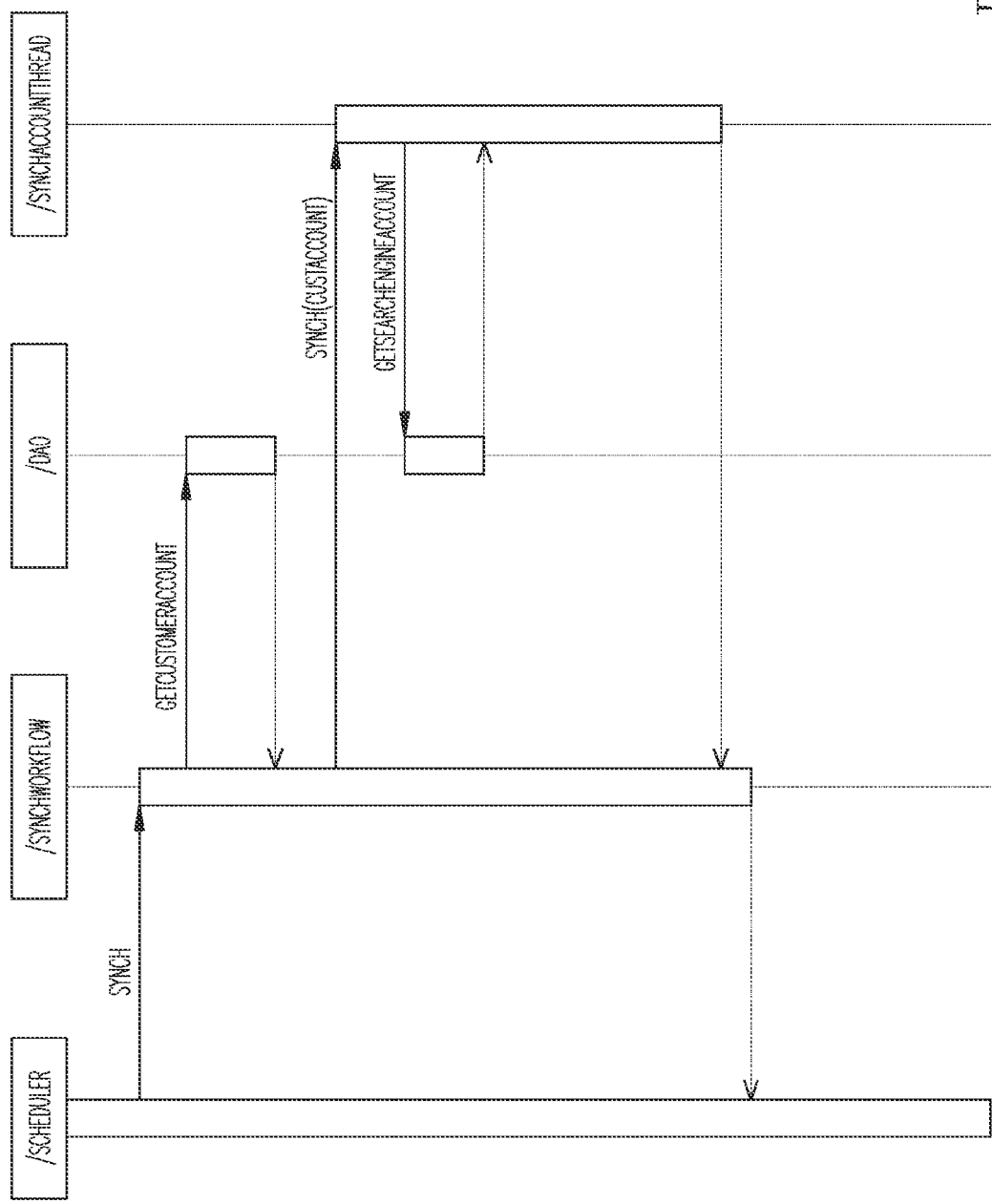
FIGS. 6A-6B are sequence diagrams, according to an example embodiment.
Figure 6B:
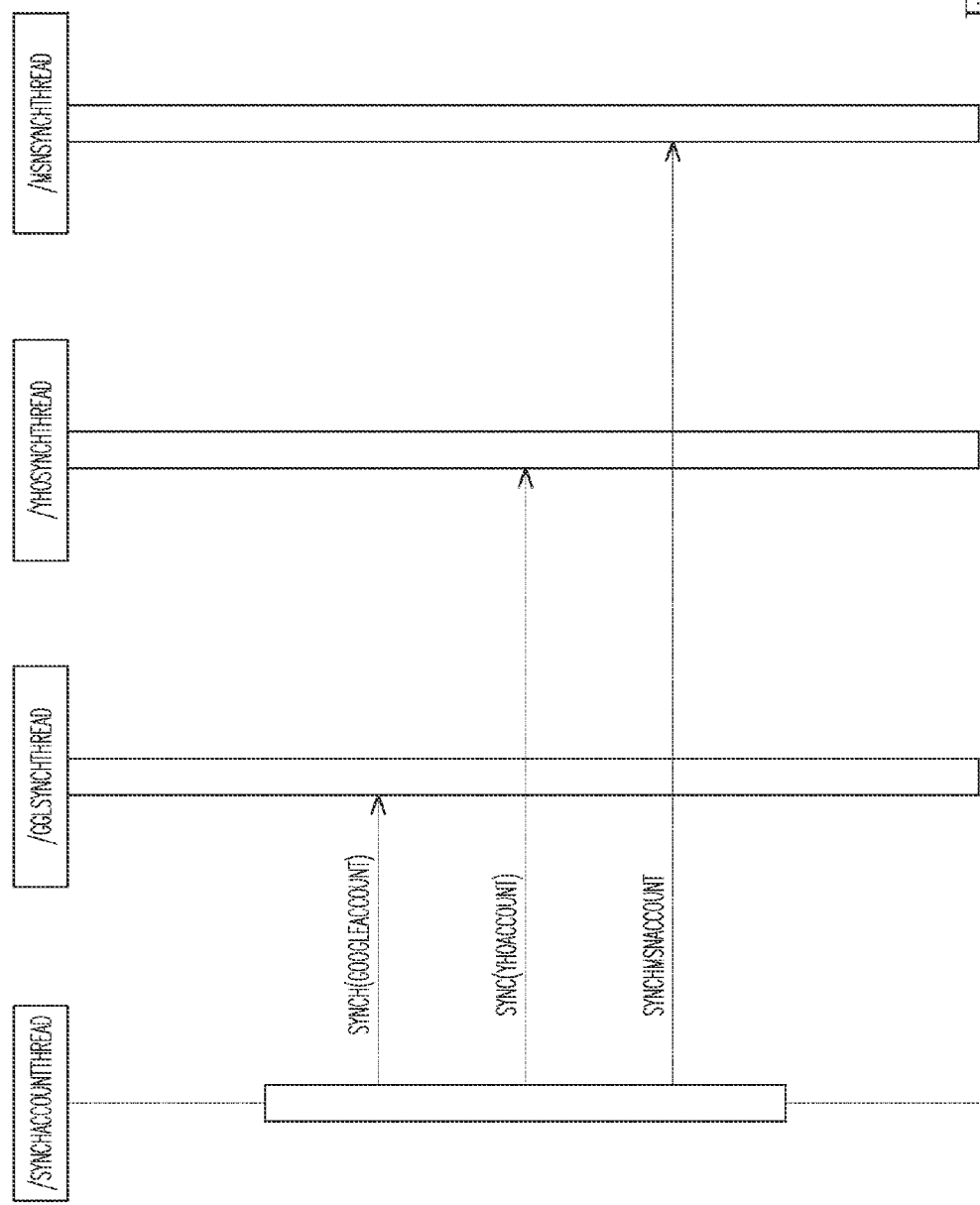

FIGS. 6A-6B are flow diagrams for Spawning SynchAccountThreads, according to various embodiments. The following pseudo code may be used with respect to the Spawning SynchAccountThreads, according to various embodiments.
1. Scheduler wakes up on scheduled time and calls the synch( ) of SynchWorkflow.
2. SynchWorkflow gets the next customerAccount to be synched from DAO. If there is a Push for any of the entities in the customerAccount pending in the Pushes_workflow table, then it should be skipped from the synchronization process as it can corrupt data.
3. For each CustomerAccount to be synched, SynchWorkflow spawns a new thread of SynchAccountThread. There is an upper limit to the number of SynchAccountThreads that can be run at a time. The limit may be configurable.
4. For each Search Engine Account under the Customer Account to be synched, the SynchAccountThread spawns its own Thread. For a Google® account, it is a GGLSynchThread. For Yahoo®—YHOSynchThread, For MSN®—MSNSynchThread. The SynchAccountThread should process the Google® accounts only if the application property synch.google=true. Similar properties for Yahoo® and MSN® accounts' synchronization are synch.msn and synch.yahoo.

The following pseudo code may work for GGLSynchThread, YSMSynchThread and MSNSynchThread, according to various example embodiments:
1. Insert a record into Synch_Workflow table for the search engine account to be synched.
2. Get the campaigns in DB for the search engine account
3. Get the campaigns from the SE for the search engine account
4. If there are campaigns in SE which are not present in DB, add it to DB
5. If there are campaigns in DB, but which are not present in SE, then delete them from DB
6. For all campaigns present in DB and SE, update the DB with the latest from SE.
7. Get the campaigns again from the DB for the search engine account to be synched. This is important as we need to consider the campaigns that were added/deleted in steps 3 and 4.
8. For each Campaign in the list got in step 6 repeat steps from 8 to 14.
9. Get the AdGroups in DB for the campaign
10. Get the AdGroups from the SE for the campaign
11. If there are AdGroups in SE which are not present in DB, add it to DB
12. If there are AdGroups in DB, but which are not present in SE, then delete them from DB
13. For all AdGroups present in DB and SE, update the DB with the latest from SE.
14. Get the AdGroups again from the DB for the campaign. This is important as we need to consider the AdGroups that were added/deleted in the steps 10 and 11.
15. For each AdGroup in the list got in step 13 repeat steps from 14 to 24.
16. Get the Ads in DB for the AdGroup
17. Get the Ads from the SE for the AdGroup
18. If there are Ads in SE which are not present in DB, add it to DB
19. If there are Ads in DB, but which are not present in SE, then delete them from DB
20. For all Ads present in DB and SE, update the DB with the latest from SE.
21. Get the Keywords in DB for the AdGroup
22. Get the Keywords from the SE for the AdGroup
23. If there are Keywords in SE which are not present in DB, add it to DB
24. If there are Keywords in DB, but which are not present in SE, then delete them from DB
25. For all Keywords present in DB and SE, update the DB with the latest from SE.
26. Update the record in the Synch_Workflow table with the endTime and errorMessage, if any.

In an embodiment, synchWorkFlow is scheduled to start only at a configured start time and should not exceed the configured end time. This is to ensure that synchronization, which is a resource intensive process, is run during off-peak hours.

In various embodiments, with respect to getting eligible accounts to Synchronize: (1) Any customer account which has never synchronized should be picked up first for synchronization; (2) After that, customer accounts with the oldest synchronization time should be picked for processing (3) Ensure that a customer account is not picked up too soon for synchronization. As a guard, there may be at least a 4 hour gap (this time limit may be configurable) between a customer account's consecutive synch's; and (4) A customer account with a pending push in the Pushes_workflow table may be skipped from synchronization as it can corrupt data.

In various embodiment with respect to threading: (1) For a small account, as assumption may be made that it takes around five minutes to synchronize the complete account. Since the system may process Google®, Yahoo® and MSN® accounts in parallel threads, it may be assumed that the ME can process 12*3=36 accounts in an hour. Thus, in a 12 hour off-peak window, ME may process 432 accounts; and (2) To attempt to do more customer accounts within a time window, we need to handle more threads of processing, but with good control on the number of threads that can be created.

In various embodiments with respect to Object Oriented Programming: (1) The pseudo code for synchronization is procedural, however, it may be implemented in an object oriented manner; and (2) LocalChangesis the object which may capture all the changes to be made to the DB.

In an embodiment, any runtime or other errors/exception during the processing of a particular record may be caught and logged in the ErrorMessage column.

In an embodiment, 2 SE APIs (GGL and YHO) have assigned a limited Quota of API units to each of its customers. For some SEs the assigned Quota may be free of cost whereas others may charge its users for the API units used. The ME may log and count the Adwords API units used for each customer account so that this can be charged to a customer. In an embodiment, for each successful Adword API call, the following details are logged into the Quota_Logs table in the database: Timestamp, API method called, API units used, Customer Account MeId for which this API method was called, and Process which called the API. This can be "Push", "Synch" or "Reports"

In an embodiment, for Pushes, the Process will be "Push." If the API was called, for example, to create a campaign for the customer account "account1", then account1.meId should be logged.

In an embodiment, for Synchronization, the Process will be "Synch." If the API was called, for example, to retrieve the keywords under the customer account "account1", then account1.meId should be logged.

In an embodiment, for Pushes, the Process will be "Reports." The customer account meId may not be logged for reporting as a single call for reports API returns the reports for all customer accounts.

For a pause operation for a customer account, the Business Logic layer may pick up all the campaigns and adGroups under a customer account and make entries for each of these in the Pushes_workflow table. All these entries may have the same MeId in the Pushes_Workflow table.

In various embodiments, the ME provides for report collection from the advertising platforms. The reports may provide performance summaries for the various campaigns running for a customer. In an example embodiment the following information is gathered for the different advertising platforms.

| Google® | Yahoo® | MSN® |
|---|---|---|
| AdDistributionWithSearchPartners | AdGrpID | AdGroupId |
| AdGroupId | averagePosition | AveragePosition |
| AdGroupStatus | cpc | CostPerConversion |
| AveragePosition | cmpgnID | CampaignId |
| CPC | numClick | Clicks |
| campaignId | numConv | Conversions |
| campaignStatus | cost | Spend |
| Clicks | numImpr | Impressions |
| Conversions | KeywordId | KeywordId |
| Cost | KeywordName | Keyword |
| dailybudget | | |
| impressions | | |
| keyword status | | |
| qualityScore | | |
| KeywordId | | |
| Keyword | | |

In an example embodiment, an advertising campaign is formulated for web-based advertising. A product or service offering is generated comprising a plurality of keywords and a URL associated with the product. A plurality of advertising instructions are produced and transmitted to a plurality of search engines for establishing an account for the product.

It is to be understood that the above description is intended to be illustrative, and not restrictive. For example, the above-illustrated embodiments (and/or aspects thereof) may be used in combination with each other. Many other embodiments may be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method comprising:
   storing, in a database of a server, advertising campaign data associated with a customer account;
   generating a synchronization thread for an advertising platform selected from a plurality of advertising platforms; and
   synchronizing, using the synchronization thread, the advertising campaign data with the advertising platform, wherein synchronizing comprises:
   selecting a proxy class associated with the advertising platform, the proxy class stored on the server;
   requesting from the advertising platform, via the proxy class, a set of campaigns that are associated with the customer account and the advertising platform;
   receiving, from the advertising platform, the set of campaigns associated with the customer account; and
   updating the advertising campaign data stored in the database based on the set of campaigns received from the advertising platform and a set of campaigns stored in the advertising campaign data.

2. The method of claim 1, wherein updating the advertising campaign data comprises:

deleting a campaign from the set of campaigns in the advertising campaign data when the campaign is not in the set of campaigns received from the advertising platform.

3. The method of claim 1, wherein updating the advertising campaign data comprises:
adding a campaign to the set of campaigns in the advertising campaign data when the campaign is in the set of campaigns received from the advertising platform but not in the set of campaigns in the advertising campaign data.

4. The method of claim 1, further comprising:
determining if there is a push pending for the customer account, a push indicating a change in the advertising campaign data requested by a user; and
delaying the generation of the synchronization thread at least until the push is completed.

5. The method of claim 4, wherein the change is to add a new campaign to the advertising campaign data.

6. The method of claim 1, further comprising:
requesting from the advertising platform, a set of ad groups for a campaign in the set of campaigns associated with the customer account stored at the advertising platform;
receiving, from the advertising platform, the ad groups for the campaign; and
updating the campaign in the advertising campaign data based on the set of ad groups received from the advertising platform and a set of ad groups stored in the advertising campaign data for the campaign.

7. The method of claim 1, further comprising:
synchronizing the advertising campaign data with a another advertising platform selected from the set of advertising platforms, wherein synchronizing comprises:
requesting from the another advertising platform, a set of campaigns associated with the customer account stored at the advertising platform;
receiving, from the another advertising platform, the set of campaigns associated with the customer account; and
updating the advertising campaign data based on the set of campaigns received from the another advertising platform and a set of campaigns stored in the advertising campaign data.

8. A system comprising:
a database with advertising campaign data associated with a customer account stored thereon;
a proxy class;
a network interface; and
a scheduler component configured to generate a synchronization thread for an advertising platform selected from a plurality of advertising platforms, wherein the synchronization thread is configured to:
request from the advertising platform, via the proxy class, a set of campaigns that are associated with the customer account and the advertising platform;
receive from the advertising platform, via the network interface, the set of campaigns associated with the customer account; and
update the advertising campaign data stored in the database based on the set of campaigns received from the advertising platform and a set of campaigns stored in the advertising campaign data.

9. The system of claim 8, further comprising:
a translator configured to translate the format of the set of campaigns received from the advertising platform to a format of the set of campaigns stored in the database.

10. The system of claim 8, wherein the scheduling component is configured to:
determine if there is a push pending for the customer account, a push indicating a change in the advertising campaign data requested by a user; and
delay the generation of the synchronization thread at least until the push is completed.

11. The system of claim 10, wherein the change is to add a new campaign to the advertising campaign data.

12. The system of claim 8, wherein updating the advertising campaign data comprises:
deleting a campaign from the set of campaigns in the advertising campaign data when the campaign is not in the set of campaigns received from the advertising platform.

13. The system of claim 8, wherein updating the advertising campaign data comprises:
adding a campaign to the set of campaigns in the advertising campaign data when the campaign is in the set of campaigns received from the advertising platform but not in the set of campaigns in the advertising campaign data.

14. A non-transitory computer-readable medium with instruction stored thereon, the instructions when executed by a processor, cause the processor to:
store, in a database of a server, advertising campaign data associated with a customer account;
generate a synchronization thread for an advertising platform selected from a plurality of advertising platforms; and
synchronize, using the synchronization thread, the advertising campaign data with the advertising platform, wherein synchronizing comprises:
selecting a proxy class associated with the advertising platform, the proxy class stored on the server;
requesting from the advertising platform, via the proxy class, a set of campaigns that are associated with the customer account and the advertising platform;
receiving, from the advertising platform, the set of campaigns associated with the customer account; and
updating the advertising campaign data stored in the database based on the set of campaigns received from the advertising platform and a set of campaigns stored in the advertising campaign data.

15. The computer-readable medium of claim 14, wherein updating the advertising campaign data comprises:
deleting a campaign from the set of campaigns in the advertising campaign data when the campaign is not in the set of campaigns received from the advertising platform.

16. The computer-readable medium of claim 14, wherein updating the advertising campaign data comprises:
adding a campaign to the set of campaigns in the advertising campaign data when the campaign is in the set of campaigns received from the advertising platform but not in the set of campaigns in the advertising campaign data.

17. The computer-readable medium of claim 14, further comprising:
determining if there is a push pending for the customer account, a push indicating a change in the advertising campaign data requested by a user; and delaying the generation of the synchronization thread at least until the push is completed.

18. The computer-readable medium of claim 17, wherein the change is to add a new campaign to the advertising campaign data.

19. The computer-readable medium of claim 14, where synchronization further comprises:
   requesting from the advertising platform, a set of ad groups for a campaign in the set of campaigns associated with the customer account stored at the advertising platform;
   receiving, from the advertising platform, the ad groups for the campaign; and
   updating the campaign in the advertising campaign data based on the set of ad groups received from the advertising platform and a set of ad groups stored in the advertising campaign data for the campaign.

20. The computer-readable medium of claim 14, further the instruction include comprise instructions to:
   synchronize the advertising campaign data with a another advertising platform selected from the set of advertising platforms, wherein synchronizing comprises:
      requesting from the another advertising platform, a set of campaigns associated with the customer account stored at the advertising platform;
      receiving, from the another advertising platform, the set of campaigns associated with the customer account; and
   updating the advertising campaign data based on the set of campaigns received from the another advertising platform and a set of campaigns stored in the advertising campaign data.

* * * * *